United States Patent

Nield et al.

[11] Patent Number: 5,823,479
[45] Date of Patent: *Oct. 20, 1998

[54] LANDING ATTITUDE MODIFIER FOR AIRPLANE

[75] Inventors: Brian N. Nield, Preston; Ross A. Landes, Everett; Monte R. Evans, Federal Way, all of Wash.

[73] Assignee: The Boeing Company, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 650,413

[22] Filed: May 20, 1996

[51] Int. Cl.$^6$ ................................................ B64C 13/18
[52] U.S. Cl. ........................... 244/187; 244/183; 244/81; 73/178 T; 701/15; 701/16
[58] Field of Search .................................. 244/183, 186, 244/187, 81, 76 C; 364/424.015, 428; 73/178 T; 701/15, 16, 18

[56] References Cited

U.S. PATENT DOCUMENTS

| | | | |
|---|---|---|---|
| 3,291,421 | 12/1966 | Kramer et al. | |
| 3,327,973 | 6/1967 | Kramer et al. | |
| 3,399,849 | 9/1968 | Hendrick | 244/183 |
| 3,738,594 | 6/1973 | Donovan et al. | 244/183 X |
| 3,860,800 | 1/1975 | Simpson | |
| 3,887,148 | 6/1975 | Devlin | |
| 3,994,455 | 11/1976 | Simpson | |
| 4,354,237 | 10/1982 | Lambregts et al. | 244/183 X |
| 4,695,013 | 9/1987 | Trampnau | |
| 4,956,780 | 9/1990 | Sankrithi et al. | 244/183 X |
| 5,000,404 | 3/1991 | Martorella | |
| 5,036,469 | 7/1991 | Pelton | |
| 5,446,666 | 8/1995 | Bauer | |

Primary Examiner—William Grant
Attorney, Agent, or Firm—Christensen O'Connor Johnson & Kindness PLLC

[57] ABSTRACT

A method modifying the landing pitch attitude of an airplane during landing approach and touchdown is disclosed. A reference value for a predetermined flight condition parameter is subtracted from a current value of the predetermined flight condition parameter, resulting in a difference value. Based upon the difference value, a schedule determines a corresponding deflection value for a movable surface capable of producing lift. The movable surface is automatically deflected to an amount equal to the deflection value. In alternative embodiments of the invention, the predetermined flight condition parameters include approach airspeed, attitude, and angle of attack.

23 Claims, 10 Drawing Sheets

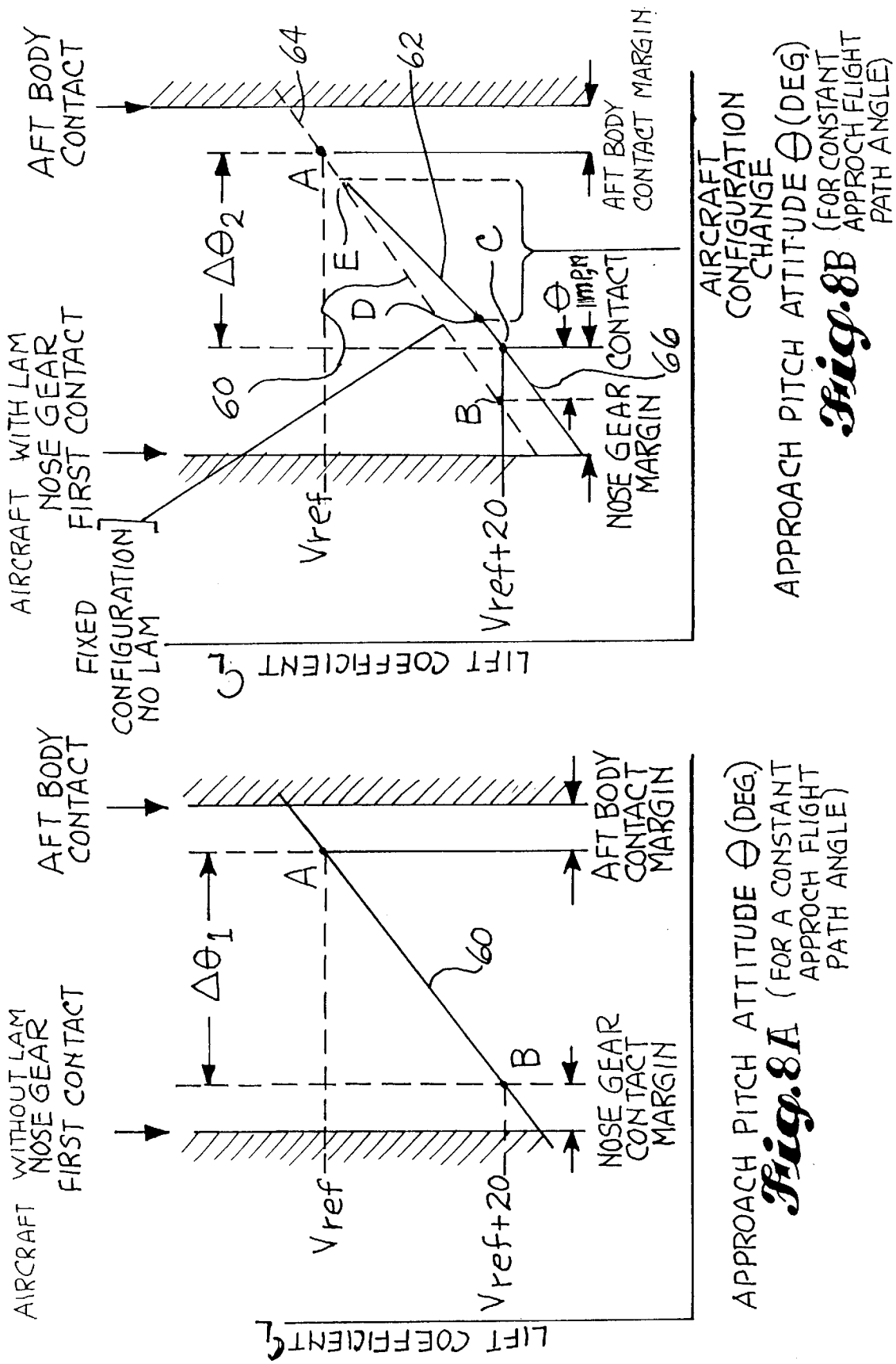

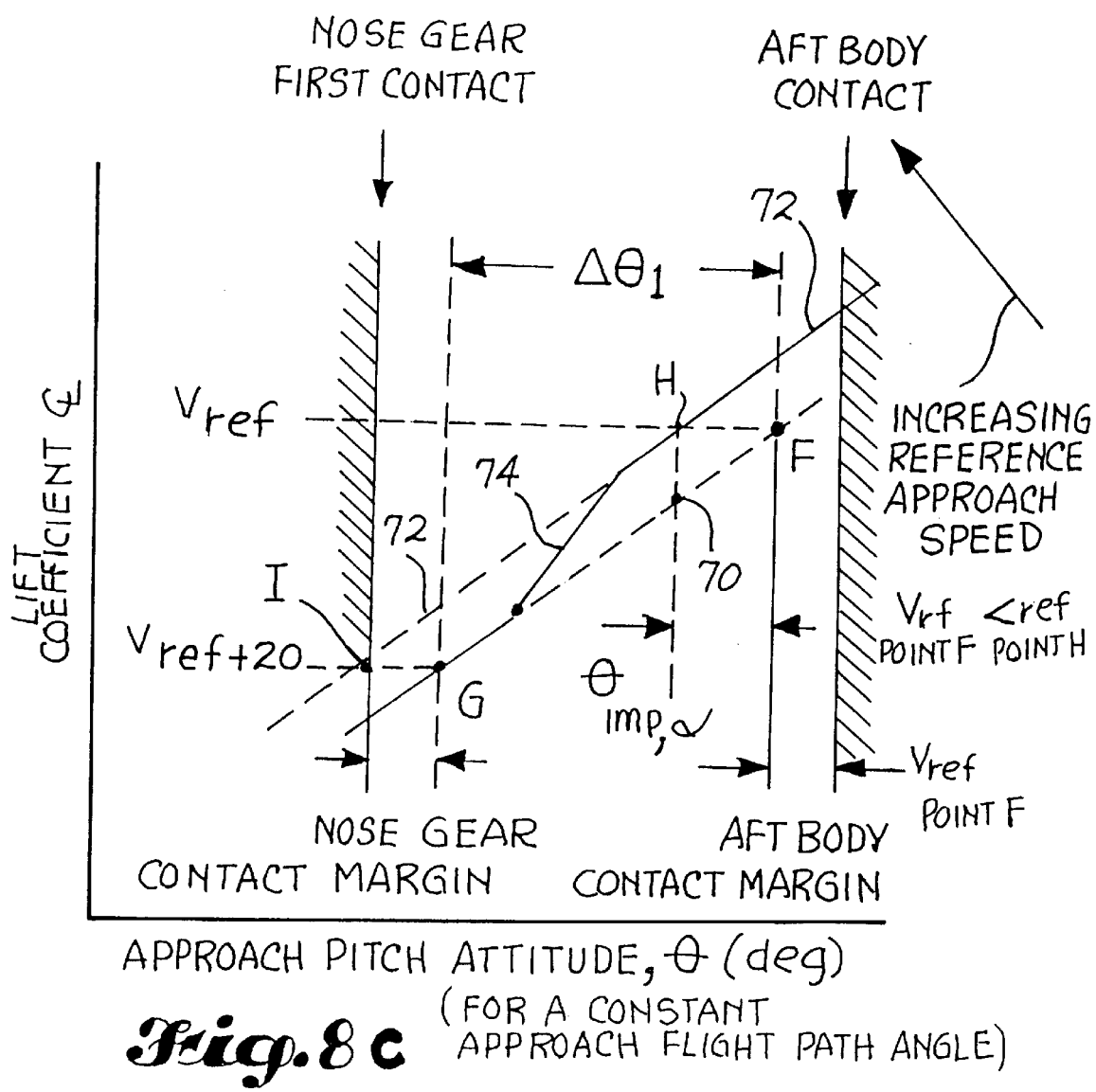
Fig. 8c (FOR A CONSTANT APPROACH FLIGHT PATH ANGLE)

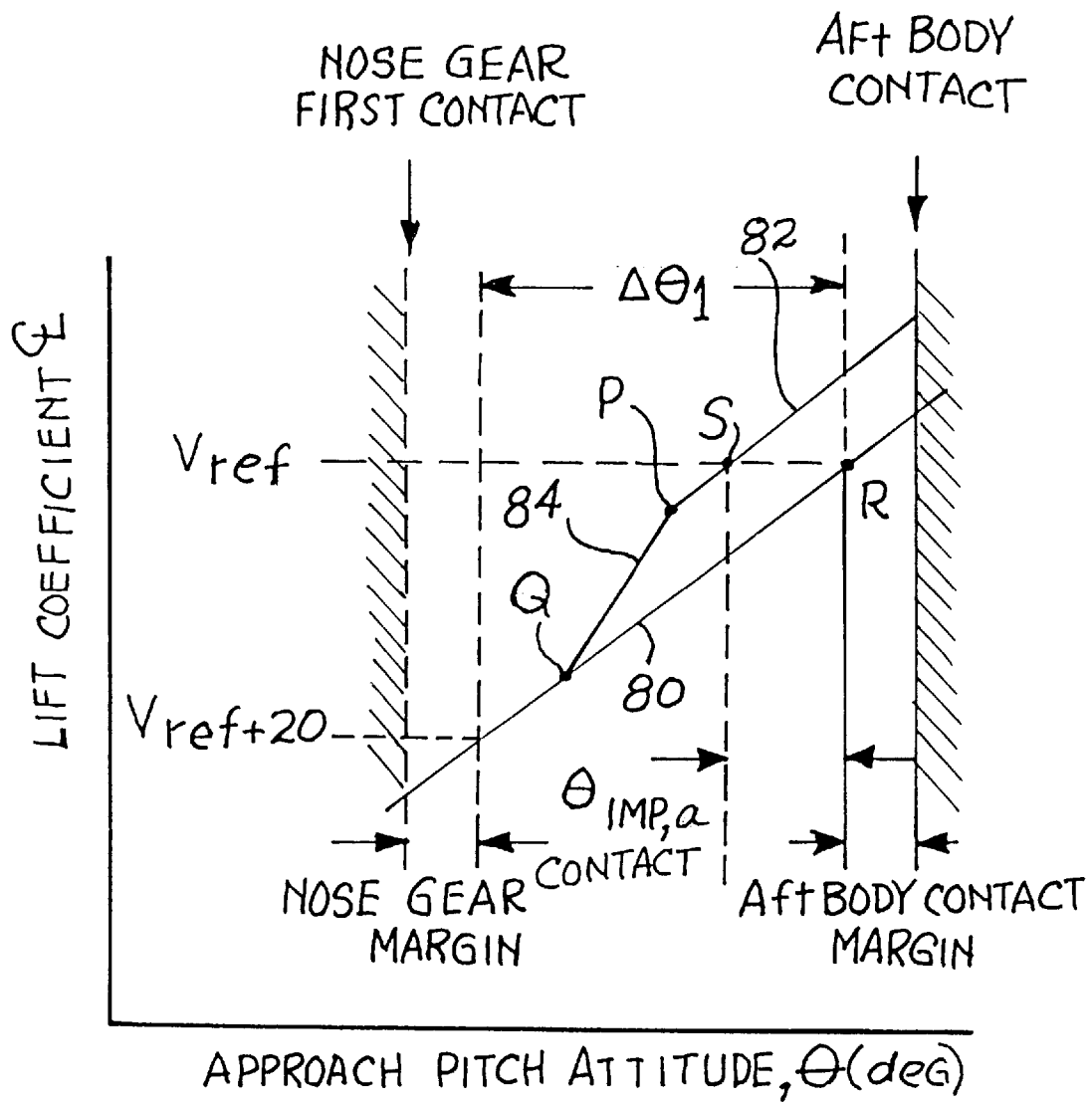
Fig. 10 (FOR A CONSTANT APPROACH FLIGHT PATH ANGLE)

LANDING ATTITUDE MODIFIER FOR AIRPLANE

FIELD OF THE INVENTION

The invention relates to airplane control systems and, more particularly, to systems for controlling airplane movable aircraft surfaces and/or high lift surfaces.

BACKGROUND OF THE INVENTION

An airplane's pitch attitude is the angle defined by the longitudinal axis of the airplane and a horizontal line. Pitch attitude is an important airplane parameter that must be taken into consideration during landing approach and touchdown. Airplane pitch attitude during landing will vary according to a number of factors. For example, atmospheric disturbances, such as the presence of a wind gust, will affect pitch attitude, requiring adjustment. Pitch attitude adjustment in response to atmospheric disturbances ensures that the desired flight path angle will be maintained during landing.

During landing the pitch attitude envelope of an airplane is in part limited by the shape of the airplane. During landing flare and touchdown, as the nose of the airplane rises to increase pitch attitude, the aft section of the airplane becomes increasingly closer to the ground. The separation between the aft section of the airplane body and the ground is known as the aft body contact margin. To minimize the chance of the aft section from contacting the ground, it is desirable to not have the pitch attitude exceed a maximum value, commonly referred to as the most aft body critical flight condition. The most aft body critical flight condition defines a predetermined maximum pitch attitude that provides a required clearance between the aft section of the airplane body and the ground during landing. The required clearance is known as the aft body contact margin requirement. This requirement is in degrees and is defined by the angle between the runway and a line extending between the main landing gear of an airplane and the lowermost area of the aft section of the airplane. See FIG. 1.

In addition to a maximum value, during landing, it is also desirable that the pitch attitude not exceed a minimum value. During approach, the main landing gear and nose gear of an airplane are lowered. Because the nose gear is not designed to withstand the impact of airplane touchdown, it is crucial to land the airplane so that the main landing gear makes contact with the ground first. The separation between the nose gear and the ground when the main landing gear contacts the ground is known as the nose gear contact margin. In order to avoid nose gear first landings, a minimum pitch attitude, commonly referred to as a most nose gear critical flight condition, is defined. Landing at pitch attitudes equal to or greater than the minimum value for the most nose gear critical flight condition ensures that the main landing gear touchdown precedes the nose gear touchdown by a predetermined value. The predetermined value is known as the nose gear contact margin requirement. This requirement is also in degrees and is defined by the angle between the runway and a line extending between the main landing gear and the nose gear on the airplane. See FIG. 2.

As stated above, due to atmospheric conditions and other parameters, the pitch attitude of an airplane during landing will vary. Sometimes, the pitch attitude will increase to a large value, lowering the aft section of the airplane dangerously close to the ground during approach and touchdown. In some instances, the aft body contact margin requirement may be violated, causing the aft section of the airplane body to contact the ground, resulting in damage to the airplane.

Various proposals to reduce either the effect or the probability of aft body contacts during landing have been made. One such proposal to reduce the effect of aft body contacts involves adding an aft body tail skid to absorb light aft section contacts with little or no resulting damage to the airplane's structure.

The inclusion of an aft body tail skid has various disadvantages. First, because of the addition of aft body tail skids to airplane structures, the aft body tail skids reduce the geometric structural clearance between the airplanes and the ground. Second, aft body tail skids necessitate modification of airplane structures. Third, aft body tail skids add weight and, thereby, decrease an airplane's payload capacity. Fourth, in the event of an aft body tail skid contact, inspection of the integrity of the aft body tail skid as well as the airplane itself is required. This inspection is economically burdensome. Furthermore, the resulting reduction in structural clearance ironically increases the probability that an airplane will contact the ground, thereby causing the above-mentioned disadvantages.

The probability of aft body contacts during approach and landing involves readjusting a variety of flight parameters to decrease the risk of an aft body contact. These adjustments include increasing landing approach speeds, increasing trailing edge flap deflections at the landing flap detents, and increasing lateral control surface symmetric droop. Vortex generators have been added to airplane wings to address the same problem. All of these solutions succeed in reducing the landing pitch attitude of an airplane, resulting in a greater aft body contact margin. However, at the same time, the solutions reduce the nose gear contact margin. Therefore, while the probability of aft body contacts is decreased, the probability of nose gear first contacts is attendantly increased.

Like aft body contacts, nose gear first contacts can be avoided by adjusting a variety of flight parameters. Decreasing landing approach speeds, decreasing trailing edge flap deflections at the landing flap detents, and decreasing lateral control surface symmetric droop all increase the landing pitch attitude of an airplane. This increase improves nose gear contact margin. The drawback of these various approaches is that increasing pitch attitude attendantly reduces aft body contact margin. The resulting reduction in aft body contact margin consequently increases the probability of aft body contacts.

To overcome the above-mentioned disadvantages, pitch attitude limiting techniques have been proposed. In effect, pitch attitude limiting automatically limits pitch attitudes to a predetermined range. While restrictions on pitch attitude may serve to reduce the probability of nose gear first contacts and aft body contacts, they unduly restrict a pilot's control of the airplane. Restricting a pilot's control of an airplane is undesirable because it violates some fundamental airplane design philosophies, which dictate that a pilot has absolute control of the airplane.

Other proposals to decrease the probability of nose gear first landings without also increasing the probability of aft body contacts have been made. One such proposal, commonly referred to as direct lift control for flight path control, is to provide a closed loop control law which uncouples flight path control from a pitch attitude control. Uncoupling flight path control from attitude control allows changes in flight path angle to be made with little or no change in pitch attitude. Flight path is controlled by modulating wing control surfaces and flaps, not by modifying pitch attitude.

While the direct lift control proposal has some advantages, it has substantial drawbacks. Because the direct lift control technique uncouples flight path control from pitch attitude control, in contrast to the flight control systems of virtually all conventional large commercial transport airplanes, direct lift control would cause airplane handling characteristics unfamiliar to commercial pilots. This proposal would likely require that commercial pilots undergo additional training to learn the different handling characteristics of airplane incorporating direct lift control. Aside from unconventional maneuvering characteristics, direct lift control also poses logistical difficulties. The implementation of direct lift control would necessitate complex system changes to ensure acceptable pilot and flight control system interaction. Furthermore, the use of spoilers, which are often utilized by the direct lift control, could result in unacceptable air frame buffeting, unduly compromising passenger comfort.

The present invention is directed to providing a method of improving nose gear contact margin and/or aft body contact margin without the foregoing and other disadvantages of previous methods.

SUMMARY OF THE INVENTION

In accordance with this invention, a method of modifying the landing attitude of an airplane during landing approach and touchdown is disclosed. A reference value for a predetermined flight condition parameter is subtracted from a current value of the predetermined flight condition parameter, resulting in a difference value. Based upon the difference value, a schedule determines a corresponding deflection value for a movable aircraft surface capable of producing lift. The movable aircraft surface is automatically deflected to an amount equal to the deflection value.

In accordance with other aspects of this invention, the movable aircraft surfaces are flaperons.

In accordance with further aspects of this invention, the predetermined flight condition parameter is approach airspeed, the reference value is reference approach airspeed, $V_{ref}$, and the current value is current approach airspeed, $V_{cur}$. The difference between the reference approach airspeed, $V_{ref}$, and the current approach airspeed, $V_{cur}$, is an airspeed difference, $\Delta V$.

In accordance with yet other aspects of this invention, the flaperons are symmetrically adjusted by an amount equal to a flaperon droop change, $\Delta \delta_{FR}$. The flaperon droop change, $\Delta \delta_{FR}$, is selected according to a predetermined schedule wherein the flaperon droop change, $\Delta \delta_{FR}$, is a function of the airspeed difference, $\Delta V$. The predetermined schedule provides a value for the flaperon droop change, $\Delta \delta_{FR}$, according to the equation:

$$\Delta \delta_{FR} = \frac{31}{15} (\Delta V - 5)$$

when the airspeed difference $\Delta V$ has value between five and 20. When the airspeed difference $\Delta V$ is less than five, the flaperon droop change $\Delta \delta_{FR}$ has a value of zero. When the airspeed difference $\Delta V$ is greater than 20, the flaperon droop change $\Delta \delta_{FR}$ has a value of 31.

In accordance with yet still further aspects of this invention, the reference approach airspeed $V_{ref}$ is determined from the equation:

$$V_{ref} = \frac{1}{\sqrt{n_{Z_{CG}}}} V_{cur} \sqrt{\frac{C_{L_{cur}}}{C_{L_{ref}}}}$$

where:
$n_{Z_{CG}}$ =normal load factor at center of gravity
$C_{L_{ref}}$ =reference lift coefficient
$C_{L_{cur}}$ =current lift coefficient In accordance with yet still further aspects of this invention, the normal load factor at center of gravity, $n_{Z_{CG}}$, is limited in value to provide maneuvering compensation.

In accordance with yet other further aspects of this invention, a signal indicative of the flaperon droop change, $\Delta \delta_{FR}$, is low pass filtered to attenuate high frequency turbulence.

In accordance with yet further other aspects of this invention, the flaperon droop change is held constant when the airplane touches the ground.

In accordance with alternate aspects of this invention, the predetermined flight condition parameter is approach attitude, the reference value is reference approach attitude, $\theta_{ref}$, the current value is current approach attitude, $\theta_{cur}$, and the difference value is an attitude difference, $\Delta \theta$.

In accordance with further alternate aspects of this invention, the predetermined flight condition parameter is approach angle of attack, the reference value is reference approach angle of attack, $\alpha_{ref}$, the current value is current approach angle of attack, $\alpha_{cur}$, and the difference value is an angle of attack difference, $\Delta \alpha$.

As will be readily appreciated from the foregoing summary, the invention provides an airplane landing attitude modifier (LAM) that improves nose gear contact margins and/or aft body contact margins. The improved margins result from the automatic, symmetric variation of movable aircraft surfaces and/or high lift surfaces, including, for example, the flaperons. Because the LAM can provide an increased aft body contact margin, the LAM obviates the need for aft body tail skids intended to protect against aft body contacts. Thus, the added weight, degradation in structural clearance, and economic expense associated with aft body tail skids are avoided. Furthermore, because the LAM can improve both the nose gear contact margin and aft body contact margin of an airplane, the limitations associated with the conventional techniques of merely adjusting landing approach speeds, trailing edge flap deflections at the landing flap detents, and lateral control surface symmetric droop are avoided. By allowing improved contact margins at both extreme ends of an airplane's landing pitch attitude envelope, the LAM overcomes the limitations of these adjustments which merely improve aft body contact margin at the expense of the nose gear contact margin or vice versa. Because the LAM does not artificially limit the available pitch attitude for an airplane, in contrast to some conventional pitch limiting methods, the absolute control of the airplane is retained by the pilot. The LAM also provides an open loop control law preserving the coupling of between the flight path control and the pitch attitude control, avoiding the aberrant maneuvering characteristics and complexity of direct lift control methods employing closed loop control laws.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 8A–8C are diagrams illustrating the performance of the invention; shown in FIGS. 3–7;

FIG. 10 is a diagram illustrating the performance of the invention shown in FIG. 9.

DETAILED DESCRIPTION OF THE PREFERRED EMBODIMENT

As is conventional, the invention is illustrated and described in the form of a control law containing discrete blocks designed to accomplish specific functions. However, it is to be understood that the invention can be actually implemented in various ways. For example, the various functions of the illustrated control law can be carried out by a suitably programmed computer. Alternatively, the functions can be carried out by digital or analog circuits.

Figure 1:
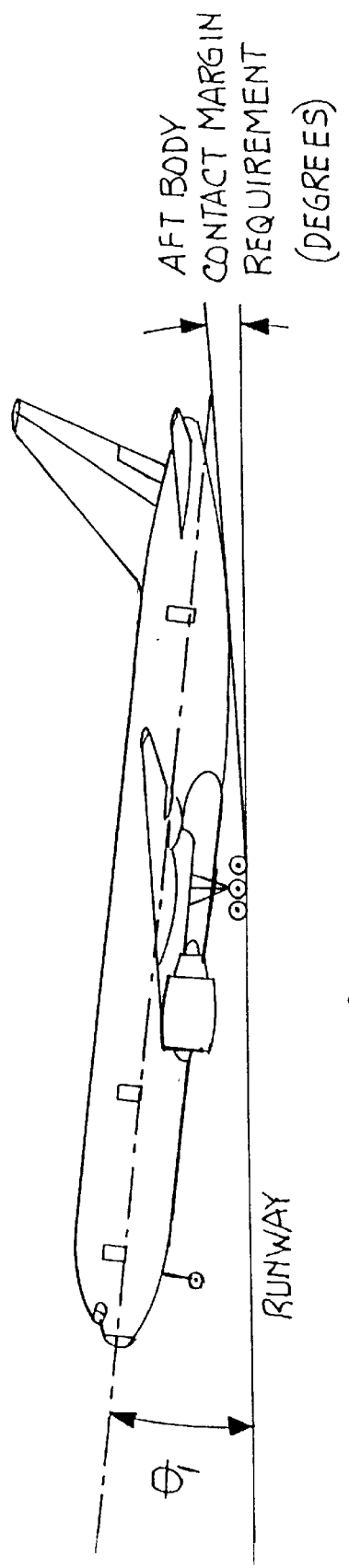
FIG. 1 illustrates the aft body contact margin requirement of an airplane.
Figure 2:
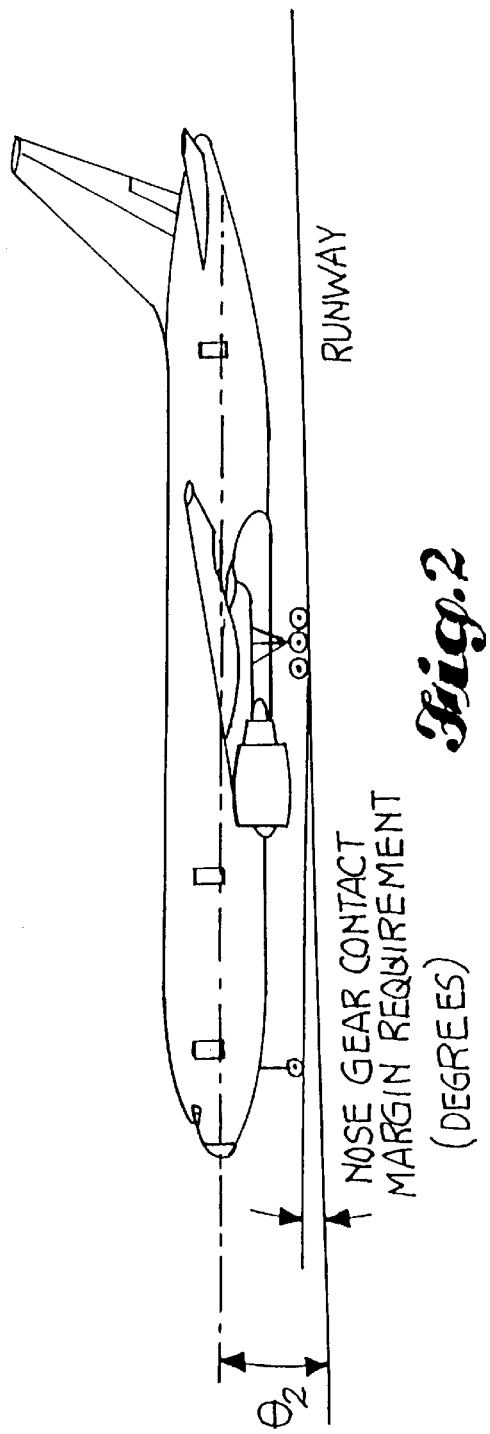
FIG. 2 illustrates the nose gear contact margin requirement of an airplane.
Figure 3:
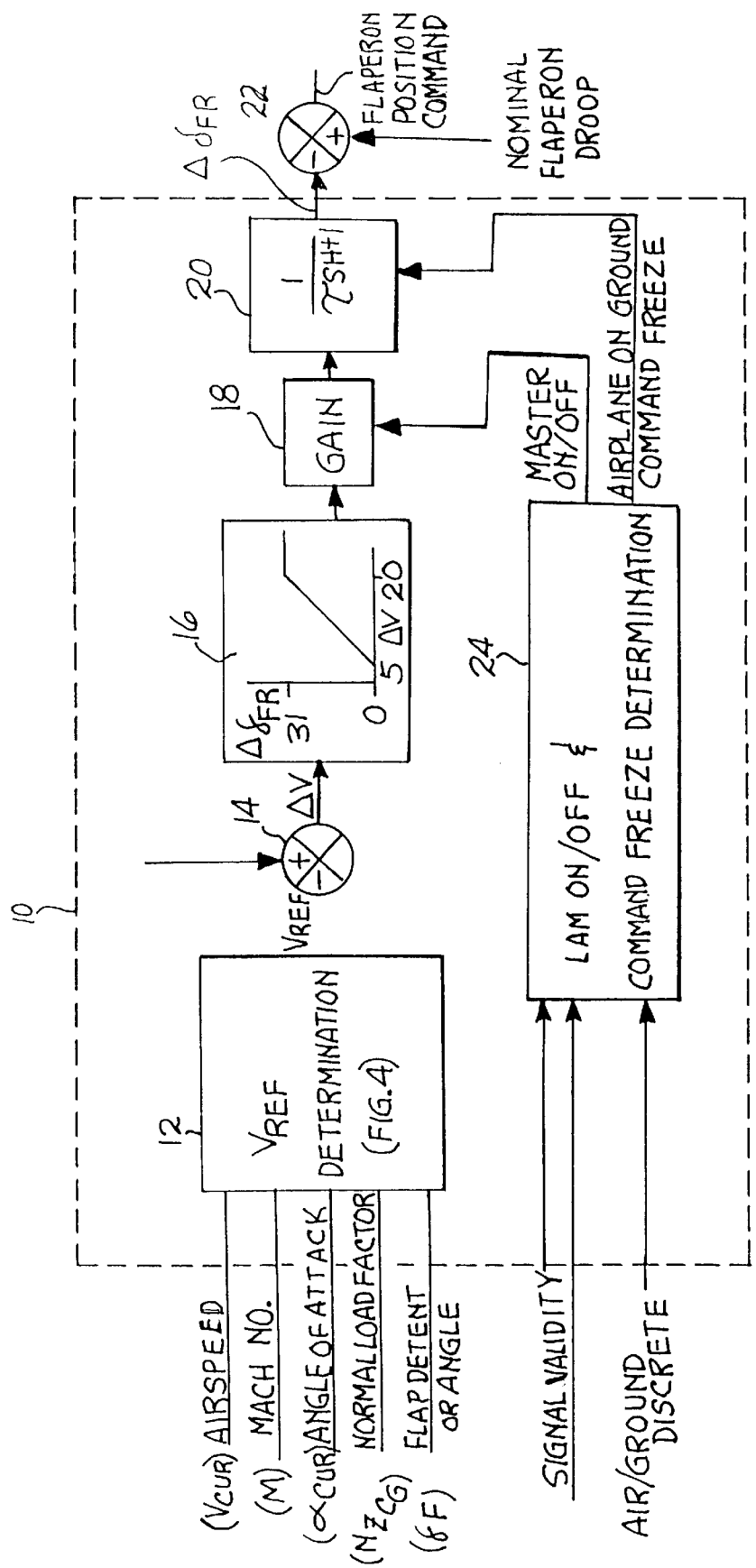
FIG. 3 is a control law diagram of a landing attitude modifier for airplane formed in accordance with this invention.

FIG. 3 illustrates a first embodiment of a landing attitude modifier (LAM) 10 formed in accordance with this invention in the form of a control law that includes several blocks that contain elements designed to accomplish various functions. The LAM 10 positions the flaperons of an airplane to improve the nose gear contact margin and the aft body contact margin during an airplane's landing. The LAM 10 symmetrically adjusts the flaperon droop from the nominal position in response to the difference between an airplane's current approach condition and reference approach condition. The adjustment provides a decreased pitch attitude variation for the airplane's landings. Although the preferred embodiment causes adjustment of the flaperons of an airplane, it is to be understood that the LAM 10 could also be applied to symmetrically adjust other lift generating movable surfaces or combinations of lift generating movable surfaces on an airplane as well.

Figure 4:
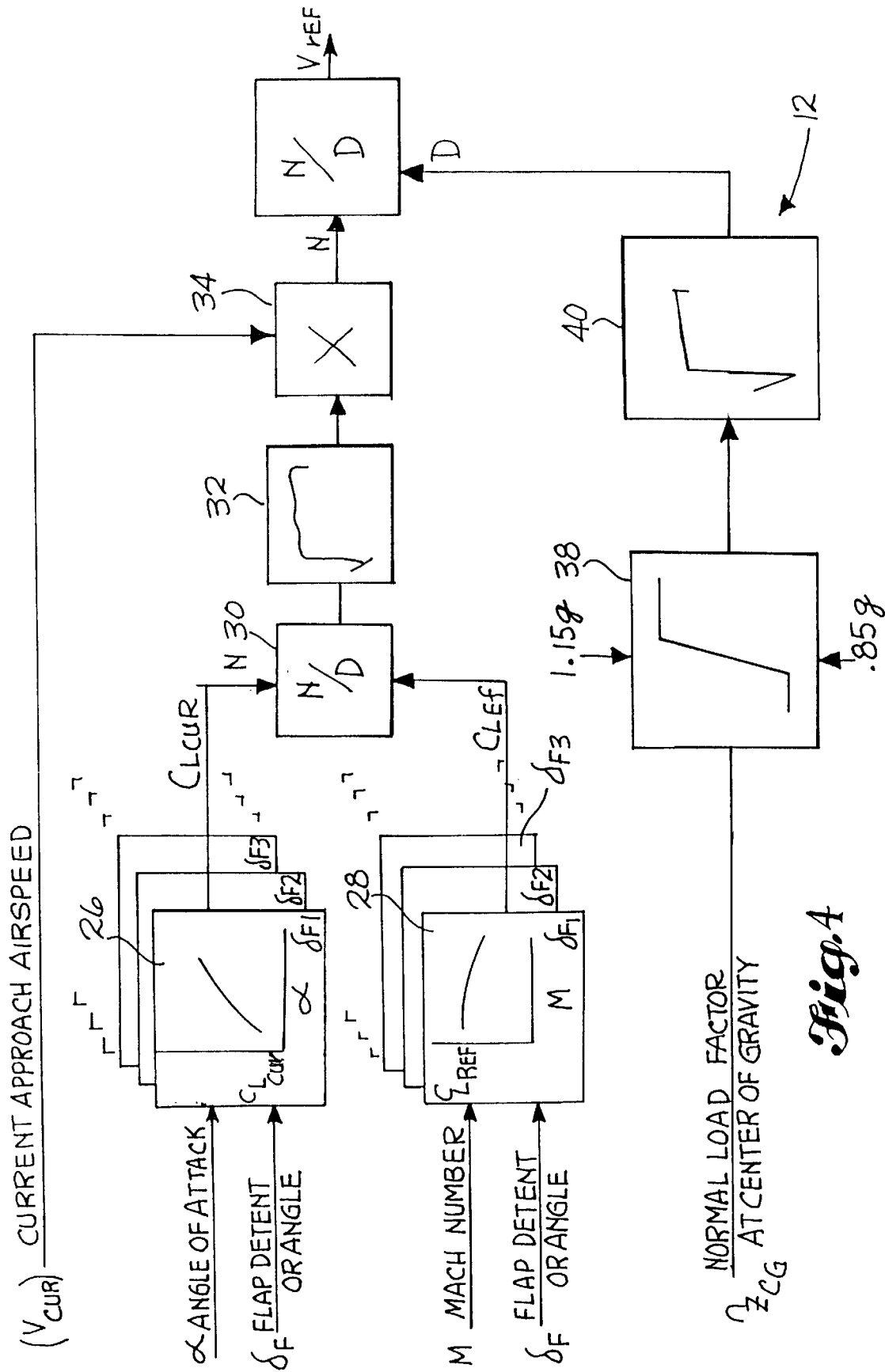
FIG. 4 is a functional diagram of a $V_{ref}$ determination suitable for use in the embodiment of the invention shown in FIG. 3.

The embodiment of the invention illustrated in FIG. 3 comprises: a reference approach speed , $V_{ref}$, determination block 12, a summer 14, a flaperon droop change, $\Delta\delta_{FR}$, schedule block 16, a gain block 18, a low pass filter 20, and a LAM on/off and command freeze determination block 24. The functions of the reference approach speed, $V_{ref}$, determination block 12 are preferably performed in the manner illustrated in FIG. 4. In essence, the reference approach speed determination block 12 carries out the formula:

$$V_{ref} = \frac{1}{\sqrt{n_{Z_{CG}}}} V_{cur} \sqrt{\frac{C_{L_{cur}}}{C_{L_{ref}}}}$$

where:
$V_{ref}$=reference approach airspeed
$n_{Z_{CG}}$=normal load factor at center of gravity
$V_{cur}$=current approach airspeed
$C_{L_{cur}}$=current lift coefficient
$C_{L_{ref}}$=reference lift coefficient FIG. 4 includes a current lift coefficient, $C_{L_{cur}}$, schedule block 26, a reference lift coefficient, $C_{L_{ref}}$, schedule block 28, a first divider 30, a first square root block 32, a multiplier 34, a second divider 36, a limiter 38, and a second square root block 40. The inputs to the current lift coefficient, $C_{L_{cur}}$, schedule block 26 are an angle of attack, $\alpha$, and a flap detent or angle, $\delta_F$, of the airplane. The current lift coefficient, $C_{L_{cur}}$, may be mathematically determined in a conventional manner as a linear approximation based on angle of attack, $\alpha$, for a given flap detent or angle, $\delta_F$. Alternatively, current lift coefficient, $C_{L_{cur}}$, values can be stored in a three-dimensional table and interpolation used to determine actual values.

Mach number, M, and a flap detent or angle, $\delta_F$, are the inputs of the reference lift coefficient, $C_{L_{ref}}$, schedule block 28. Based upon the mach number, M, and the flap detent or angle, $\delta_F$, the reference lift coefficient, $C_{L_{ref}}$, schedule block 28 determines a reference lift coefficient, $C_{L_{ref}}$. Preferably reference lift coefficient, $C_{L_{ref}}$, is 1.53 for a flap detent of 30 and 1.39 for a flap detent of 25 for the Boeing 777. As with the current lift coefficient, $C_{L_{cur}}$, schedule block 26, this can be done mathematically or using a three-dimensional look up table. As is well known to those skilled in aerodynamics, reference lift coefficient, $C_{L_{ref}}$, is a reference value that relates to the aft body contact margin, nose gear contact margin, and landing field length requirements of an airplane.

The first divider 30 divides the current lift coefficient, $C_{L_{cur}}$, by the reference lift coefficient, $C_{L_{ref}}$. The square root of the quotient is determined (block 32) and the result multiplied by the current approach airspeed, $V_{cur}$, in the multiplier 34.

The normal load factor at the center of gravity, $n_{Z_{CG}}$, provides maneuvering compensation by preserving the baseline stability and maneuvering sensitivity of the airplane over the normal commercial transport maneuvering range. The normal load factor at center of gravity, $n_{Z_{CG}}$, is applied to and limited by the limiter 38. The maximum and minimum value of the limiter 38 are chosen to define the range of normal load factor, $n_{Z_{CG}}$, over which baseline stability will be preserved and to ensure no degradation in the absolute maneuver capability of the airplane. Preferably, the normal load factor at the center of gravity, $n_{Z_{CG}}$, is limited to a maximum value of 1.15 g and a minimum value of 0.85 g. The square root of the limited value of the normal load factor at the center of gravity, $n_{Z_{CG}}$, is determined by the second square root block 40. The output of the multiplier 34 is divided by the output of the second square root block 40 in the second divider 36. The output of the second divider is the reference approach airspeed, $V_{ref}$. As will be appreciated by those skilled in this art and others, the reference approach speed, $V_{ref}$, may be determined by other methods. For example, the reference approach speed, $V_{ref}$, may be based on a schedule that depends on the gross weight of the airplane at a given flap position.

Returning to FIG. 3, the reference approach speed, $V_{ref}$, is subtractively summed with the current approach airspeed, $V_{cur}$ in the summer 14. The airspeed difference, $\Delta V$, is applied to the flaperon droop change, $\Delta\delta_{FR}$, schedule block 16. In the preferred embodiment of the invention, the flaperon droop change, $\Delta\delta_{FR}$, is a function of the airspeed difference, $\Delta V$. If the airspeed difference, $\Delta V$, is less than five, the flaperon droop change, $\Delta\delta_{FR}$, has a value of zero. If the airspeed difference, $\Delta V$, is between five and 20, the flaperon droop change, $\Delta\delta_{FR}$, is determined according to the equation:

$$\Delta\delta_{FR} = \frac{31}{15}(\Delta V - 5)$$

If the airspeed difference, $\Delta V$, is greater than 20, the flaperon droop change, $\Delta\delta_{FR}$, has a value of 31. The flaperon droop change schedule block can vary from airplane to airplane. The flaperon droop change, $\Delta\delta_{FR}$, is applied to the gain block 18. As will be described in more detail below, the gain block 18 applies a gain of either zero or one to $\Delta\delta_{FR}$, depending on the LAM on/off and command freeze determination 24. Thus, the gain block, in essence, is an on/off switch. The output of the gain block 18 is applied to the low pass filter 22. The Laplace transform on the low pass filter 22 is:

$$\frac{1}{\tau s + 1}$$

where $\tau$ can vary from airplane to airplane. Preferably, $\tau=2$ seconds for the Boeing 777. The low pass filter 20 attenuates high frequency signal content due to turbulence and preserves the airplane's short period dynamic response while maintaining responsiveness to moderate windshears. The low pass filter 20 bandwidth also allows the flaperons to be repositioned to their nominal position prior to stall warning. The output of the low pass filter 20, a flaperon droop change, $\Delta\delta_{FR}$, command, is applied to a further summer 22. A nominal flaperon droop signal is also applied to the summer 22. The summer subtracts the flaperon droop change, $\Delta\delta_{FR}$, command from the nominal flaperon droop signal. The output of the summer 22 is a flaperon position command.

The LAM on/off and command freeze determination block 24 receives the flap detent or angle, $\delta_F$, input, a composite signal validity input, and an air/ground discrete input. Based upon the flap detent or angle, $\delta_F$, input and the state of the signal validities and air/ground discrete inputs, the LAM on/off and command freeze determination block 24 turns the LAM 10 on and off. For normal system operations, the state of the signal validity inputs indicates that a set of conditions described below are satisfied, and the LAM on/off and command freeze determination block 24 produces an on output when the flap detent or angle, $\delta_F$, input indicates that the flaps of the airplane are in a landing flap detent position. Preferably, this requires a landing flap detent of 25° or 30° for the Boeing 777.

If the flap detent or angle, $\delta_F$, input and the signal validity and air/ground discrete inputs are all favorable, the LAM on/off and command freeze determination block 24 outputs an on signal to the gain block 18 that causes the gain block 18 to have a value of one. When the gain block 18 has a value of one, the LAM 10 is operational. If any of the flap detent or angle, $\delta_F$, the signal validity or air/ground discrete inputs are not favorable, the LAM on/off and command freeze determination block 24 outputs an off signal that causes the gain block 18 to have a zero value. The zero gain value deactivates the LAM 10 and restores the flaperons to their nominal droop position.

The state of the signal validity is determined by checking a variety of conditions. The checks include a flaperon operation check, a LAM compensated speedtape display check, an airspeed check, an angle of attack, a, check, and a mach number, M, check. The flaperon operation check determines if the left and right flaperons are operating correctly. The LAM compensated speedtape display check determines if the warning electronics system of the airplane has compensated for the LAM 10 in its speedtape display and function. The airspeed check, the angle of attack, $\alpha$, check, and the mach number, M, check involve checking multiple sources using redundancy management algorithms to ensure signal validity, as well as determining whether each parameter falls within a desirable range of values. If all the checks are satisfactory, the signal validity state is valid. If any of the checks fail, the signal validity state is invalid, which causes the gain block 18 to have a zero value.

The state of the air/ground discrete input to the LAM on/off and command freeze determination block 24 is based on a check of the position the airplane's main landing gear truck to determine whether the airplane is on the ground or in flight. As soon as the position of the truck indicates touchdown, the LAM on/off and command freeze determination block 24 outputs an airplane on ground command freeze to the low pass filter 50. The airplane on ground command freeze holds the output of the low pass filter 20 constant upon touchdown, which effectively freezes the flaperon droop at its touchdown position. Until the airplane on ground command freeze is received, the LAM 10 allows adjustment of flaperon droop in response to current approach airspeed, $V_{cur}$.

Figure 5:
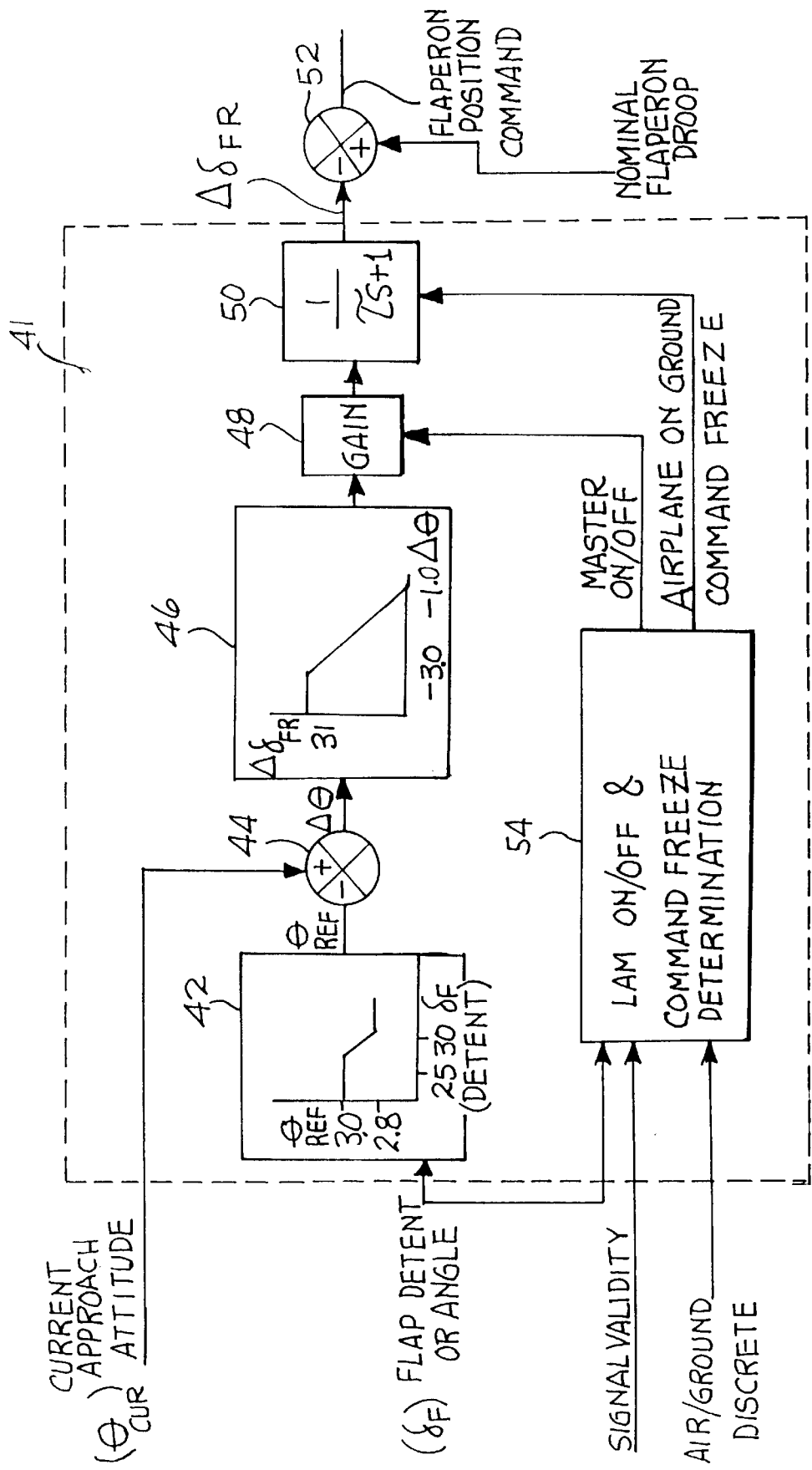
FIG. 5 is a control law diagram of an alternative embodiment of the invention.

FIG. 5 illustrates an alternate embodiment of a LAM 41 formed in accordance with this invention. The LAM 41 illustrated in FIG. 5 comprises: a reference approach attitude, $\theta_{ref}$, schedule block 42, a summer 44, a flaperon droop change, $\Delta\delta_{FR}$, schedule block 46, a gain block 48, a low pass filter 50, and a LAM on/off and command freeze determination block 54. The reference approach attitude, $\theta_{ref}$, schedule block 42 receives a flap detent or angle, $\delta_F$, input. Based on the flap detent or angle, $\delta_F$, input, the reference approach attitude, $\theta_{ref}$, schedule block 42 determines a reference approach attitude, $\theta_{ref}$. The reference approach attitude $\theta_{ref}$ represents the pitch attitude of an airplane when it is flying on the desired landing flight path angle of the reference approach airspeed, $V_{ref}$, and a given flap detent or angle, $\delta_F$. Preferably, the reference approach attitude, $\theta_{ref}$, has a value of 3.0 degrees for a flap detent of 25 and a value of 2.8 degrees for a flap detent of 30. Flap detents of 25 and 30 are normal landing flap detent positions for the Boeing 777.

The output of the reference approach attitude, $\theta_{ref}$, schedule block 42 is applied to the summer 44. The current approach attitude, $\theta_{cur}$, of the airplane is also applied to the summer 44. The summer 44 subtracts the reference approach attitude, $\theta_{ref}$, from the current approach attitude, $\theta_{cur}$. The output of the summer 44 is an attitude difference, $\Delta\theta$.

The attitude difference, $\Delta\theta$, is applied to the flaperon droop change, $\Delta\delta_{FR}$, schedule block 46. The flaperon droop change, $\Delta\delta_{FR}$, schedule block 46 produces a flaperon droop change, $\Delta\delta_{FR}$, as a function of attitude difference, $\Delta\theta$. More specifically, the flaperon droop change, $\Delta\delta_{FR}$, has a value of 31 degrees when the attitude difference, $\Delta\theta$, has a value of −3 degrees or less. The flaperon droop change, $\Delta\delta_{FR}$, has a value of 0 degrees when the attitude difference, $\Delta\theta$, has a value of −1 degree or greater when the attitude difference, $\Delta\theta$, has a value between −3 degrees and −1 degree, the value of the flaperon droop change, $\Delta\delta_{FR}$, is determined in accordance with the equation:

$$\Delta\delta_{FR} = \frac{-31}{2}(\Delta\theta + 1)$$

These flaperon droop change, $\Delta\delta_{FR}$, values are the preferred values for the Boeing 777 but may be different for other airplanes.

The output of the flaperon droop change, $\Delta\delta_{FR}$, schedule block 46 is applied to the gain block 48. The operation of the gain block 48, the low pass filter 50, and the LAM on/off and command freeze determination 54 function in the same way these elements function in the embodiment of the invention illustrated in FIG. 3 and described above. As a result, these blocks are not further discussed. The output of the LAM 41 illustrated in FIG. 5 is a flaperon droop change, $\Delta\delta_{FR}$, command that, as with the embodiment of the invention shown in FIG. 3, is subtractively summed with a nominal flaperon droop in a summer 52 to produce a flaperon position command.

Figure 6:
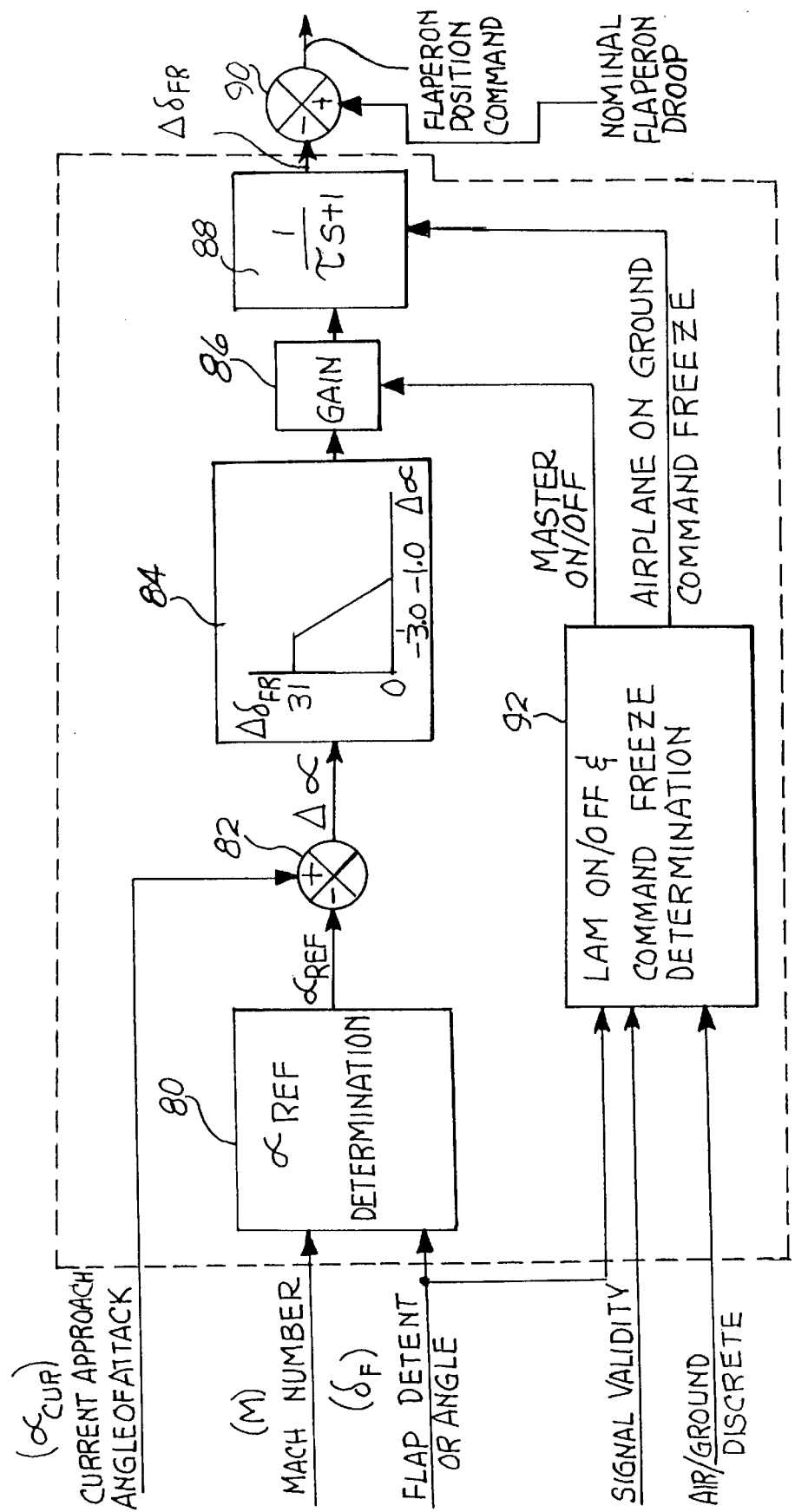
FIG. 6 is a functional diagram of another alternative embodiment of the invention.
Figure 7:
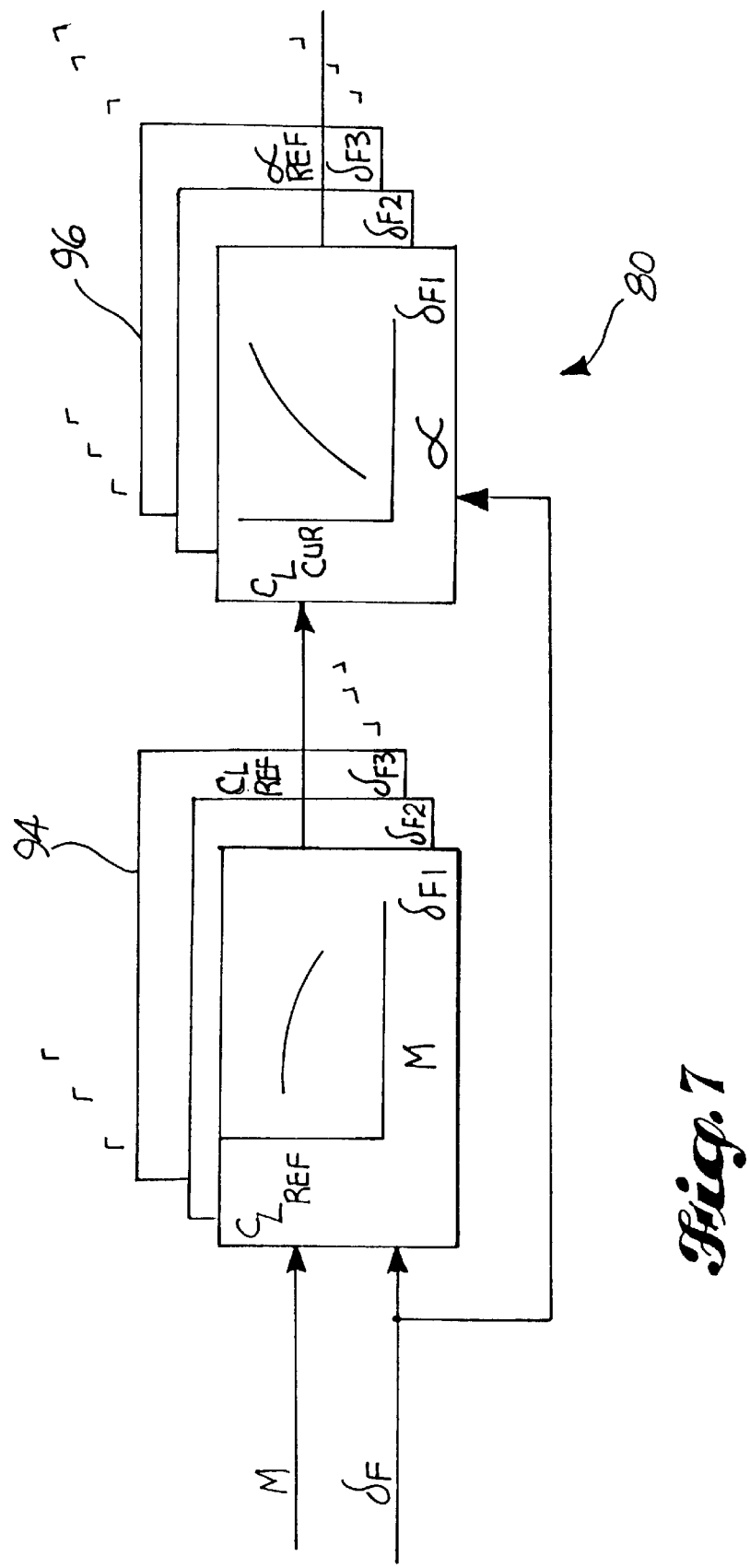
FIG. 7 is a functional diagram of a $\alpha_{ref}$ determination suitable for use in the embodiment of the invention shown in FIG. 6.

FIG. 6 illustrates another alternative embodiment of a LAM 81 formed in accordance with this invention. The LAM 81 illustrated in FIG. 6 includes: a reference approach angle of attack, $\alpha_{ref}$, determination block 80, a summer 82, a flaperon droop change, ($\Delta\delta_{FR}$) schedule block 84, a gain block 86, a low pass filter 88, and a LAM on/off and command freeze determination block 92. FIG. 7 functionally illustrates how a reference approach angle of attack, $\alpha_{ref}$, is determined by the reference approach angle of attack, $\alpha_{ref}$, determination block 80. The reference approach angle of attack, $\alpha_{ref}$, determination block 80 includes a reference lift coefficient, $C_{L_{ref}}$, schedule block 94 and a current lift coefficient, $C_{L_{cur}}$, schedule block 96.

The reference lift coefficient, $C_{L_{ref}}$, schedule block 94 receives a mach number, M, input and a flap detent or angle, $\delta_F$, input. Based upon these inputs, a reference lift coefficient, $C_{L_{ref}}$, is determined. Preferably, the reference lift coefficient, $C_{L_{ref}}$, has a value of 1.53 for a flap detent of 30 and a value of 1.39 for a flap detent of 25 for the Boeing 777. As noted above, flap detents of 25 and 30 are normal flap detent landing settings for the Boeing 777. The reference lift coefficient, $C_{L_{ref}}$, is applied to the current lift coefficient, $C_{L_{cur}}$, schedule block 96. The current lift coefficient, $C_{L_{cur}}$, schedule block 96 determines a reference approach angle of attack, $\alpha_{ref}$, based on $C_{L_{ref}}$ and the flap detent or angle, $\delta_F$, input.

Referring to FIG. 6, the reference approach angle of attack, $\alpha_{ref}$, is applied to the summer 82. The current approach angle of attack, $\alpha_{cur}$, of the airplane is also applied to the summer 82. The summer subtracts the reference approach angle of attack, $\alpha_{ref}$, from the current approach angle of attack, $\alpha_{cur}$. The output of the summer 82 is an angle of attack difference, $\Delta\alpha$. The angle of attack difference, $\Delta\alpha$, is applied to the flaperon droop change, $\Delta\delta_{FR}$, schedule block 84. The flaperon droop change, $\Delta\delta_{FR}$, schedule block 84 produces a flaperon droop change, $\Delta\delta_{FR}$, as a function of the angle of attack difference, $\Delta\delta$.

More specifically, the flaperon droop change, $\Delta\delta_{FR}$, has a value of 31 degrees when the angle of attack difference, $\Delta\alpha$, has a value of -3 degrees or less. The flaperon droop change, $\Delta\delta_{FR}$, has a value of 0 degrees when the angle attack difference, $\Delta\alpha$, has a value of -1 degree or greater. When the angle of attack difference, $\Delta\alpha$, has a value between -3 degrees and -1 degree, the value of the flaperon droop change, $\Delta\delta_{FR}$, is determined according to the equation:

$$\Delta\delta_{FR} = \frac{-31}{2}(\Delta\alpha + 1)$$

These flaperon droop change, $\Delta\delta_{FR}$, values are preferred values for the Boeing 777. They may be different for other types of airplanes. The flaperon droop change, $\Delta\delta_{FR}$, is applied to the gain block 86. The gain block 86, the low pass filter 88, and the LAM on/off and command freeze determination block 92 function in the same way the corresponding elements function in the embodiment of the invention illustrated in FIG. 3 and described above. Therefore, their operation is not discussed here. The output of the LAM 81 illustrated in FIG. 6 is a flaperon droop change, $\Delta\delta_{FR}$, command that, as with the embodiment of the invention shown in FIG. 3 is subtractively summed with a nominal flaperon droop in a summer 90 to produce a flaperon position command.

As stated above, the LAM can increase both the nose gear contact margin and/or the aft body contact margin. FIGS. 8A–8C illustrate how a LAM 10 of the type shown in FIG. 3 improves nose gear contact margin and aft body contact margin in comparison to an airplane not having such a LAM. FIG. 8A is a graph illustrating the variation (line 60) of a lift coefficient $C_L$ with the approach pitch attitude ($\theta$) for an airplane without a LAM for a constant approach flight path angle. The abscissa is the variation in approach pitch attitude ($\theta$) in degrees and the ordinate indicates the variation in the lift coefficient $C_L$. Line 60 has a constant positive slope. Two spaced-apart vertical lines represent a nose gear first contact and an aft body contact. As will be appreciated by those skilled in this art and others, in order to compensate for wind gusts, the speed of an airplane will normally be between $V_{ref}$ and $V_{ref+20}$ during landing approach and touchdown. Point A on line 60 corresponds to when the airplane flies at $V_{ref}$. Point B on line 60 corresponds to when the airplane flies at $V_{ref+20}$. The horizontal distance between point A and the line indicating the aft body contact defines an aft body contact margin when flying at $V_{ref}$. Similarly, the horizontal distance between point B and the line indicating a nose gear first contact defines nose gear contact margin when flying at $V_{ref+20}$. The horizontal distance between point A and point B on line 60 defines a pitch attitude variation $\Delta\theta_1$. The pitch attitude variation $\Delta\theta_1$ represents the total approach pitch attitude variation for an airplane not having a LAM at one center of gravity.

FIG. 8B illustrates how the nose gear contact margin is improved by the addition of LAM to the airplane represented in FIG. 8A. Line 60 of FIG. 8A is shown in dashed form and is included for reference purposes. Line 62 illustrates the new performance provided by the addition of a LAM. Point C on line 62 indicates the situation when the airplane is flying at $V_{ref+20}$. The horizontal distance separating point B on line 60 and point C on line 62 defines a nose gear contact margin improvement $\theta_{imp,n}$. Points D and E on line 62 correspond to the maximum and minimum values developed by the flaperon droop change, $\Delta\delta_{FR}$, schedule block 16 shown in FIG. 3. The end segments 64, 66 of line 62 represent the operating region of the LAM corresponding to the maximum and minimum constant values of the flaperon droop change $\Delta\delta_{FR}$, where the flaperons are held at fixed extreme deflections. The region on line 62 between point D and point E represent the airplane configuration change caused by incorporated a LAM. The horizontal distance between the points on line 62 corresponding to $V_{ref}$ and $V_{ref+20}$ define a pitch attitude variation $\Delta\theta_2$. Comparison of $\Delta\theta_1$ in FIG. 8A with $\Delta\theta_2$ in FIG. 8B illustrates that $\Delta\theta_2$ is less than $\Delta\theta_1$. The relatively smaller $\Delta\theta_2$ value denotes an improvement in pitch attitude variation and, more specifically, nose gear contact margin.

FIG. 8C illustrates an improved aft body contact margin caused by incorporating a LAM 10 of the type shown in FIG. 3 at the reference approach speed, $V_{ref}$. Line 70 (partially dotted) illustrates the variation of the lift coefficient $C_L$ with the approach pitch attitude $\theta$ without a LAM. The horizontal distance between point F on line 70 and the line indicating aft body contact defines an aft body contact margin for an airplane without a LAM. The horizontal distance between point G on line 70 and the line indicating nose gear first contact represents a nose gear contact margin for an airplane without a LAM. Line 72 (partially dotted) illustrates the variation of the lift coefficient $C_L$ with the approach pitch attitude, $\theta$, with an increase in landing approach speed. At the reference approach speed, i.e., at $V_{ref}$, the aft body contact margin is improved. The horizontal distance between point H on line 72 and the line indicating aft body contact is greater than the distance between point F and the line indicating aft body contact. The improvement in the aft body contact margin is indicated by $\Theta_{imp,a}$.

If no LAM were included, line 72 (partially dotted portion) would intersect the line indicating nose gear first contact at $V_{ref+20}$. As a result there would be no nose gear contact margin. This does not occur. Line 74 illustrates how a LAM changes the situation. The LAM causes a change in slope to occur (line 74) as the reference speed changes. Line 74 intersects line 70 before reaching the nose gear contact margin. As a result, the nose gear contact margin without a LAM is retained.

As will be readily appreciated by an understanding of the foregoing discussion, a LAM may also be used to provide both aft body contact margin improvement and nose gear contact margin improvement. Improving both nose gear contact margin and aft body contact margin can be achieved by providing a LAM that combines the features depicted in FIGS. 8B and 8C.

Figure 9:
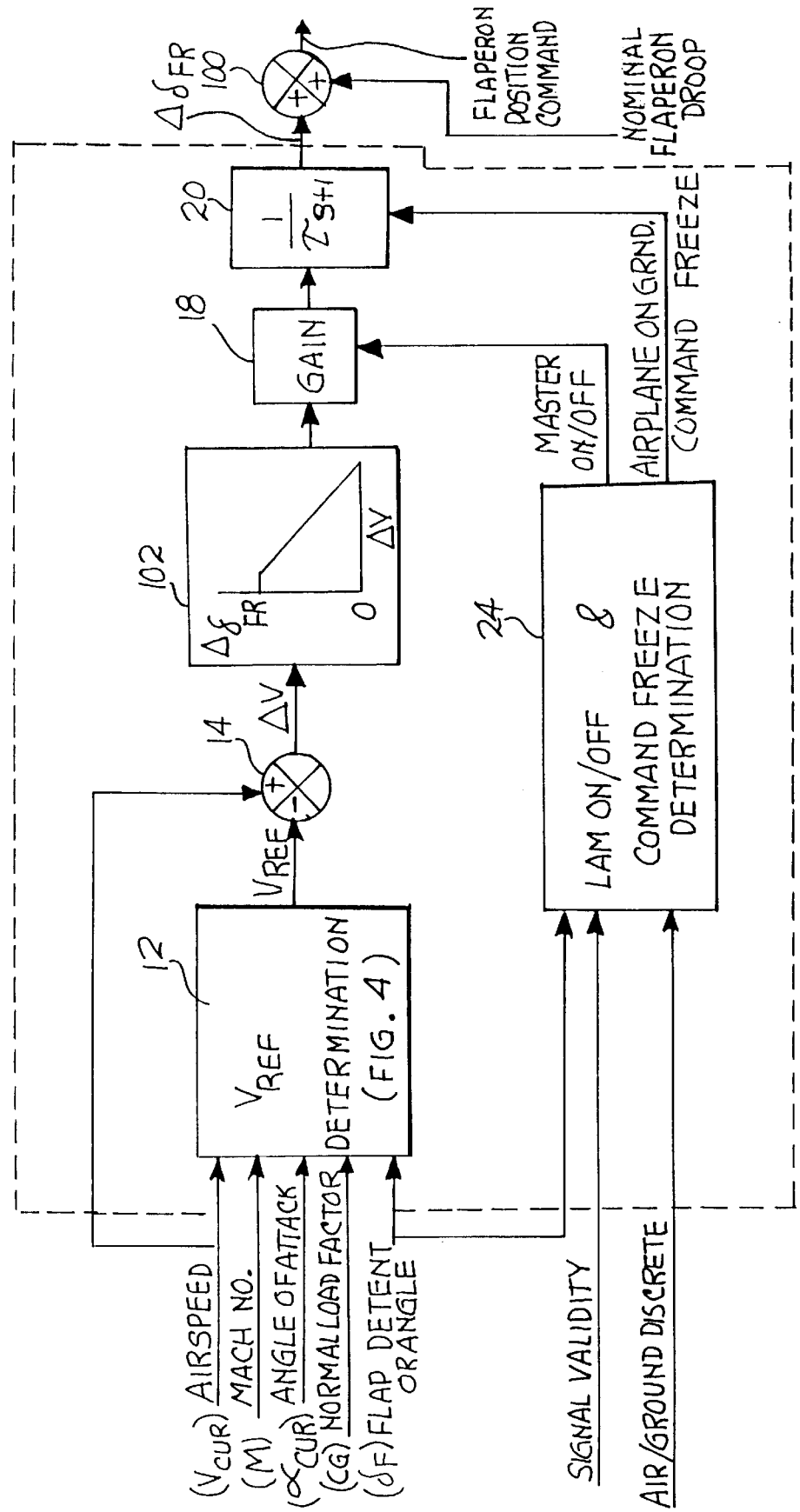
FIG. 9 is a control law diagram of yet another alternative embodiment of the invention.

FIG. 9 illustrates an alternative method for improving aft body contact margin by modifying a LAM 10 as the type shown in FIG. 3. The LAM 10 shown in FIG. 9 is identical to the LAM 10 shown in FIG. 3 except for the substitution of a flaperon droop change, $\Delta\delta_{FR}$, schedule block 102 and a summer 100 which replace the flaperon droop change, $\Delta\delta_{FR}$, schedule block 16 and the summer 22 respectively of FIG. 3. As shown in FIG. 9, the flaperon droop change, $\Delta\delta_{FR}$, has a maximum value when the airspeed difference, $\Delta V$, has value less than a predetermined lower value. When the airspeed difference, $\Delta V$, has a value between the predetermined lower value and a predetermined higher value, the value of the flaperon droop change, $\Delta\delta_{FR}$, has a value that continuously decreases from the maximum value to a minimum value. When the airspeed difference is greater than the predetermined higher value, the flaperon droop change, $\Delta\delta_{FR}$, has the minimum value.

The flaperon droop change, $\Delta\delta_{FR}$, command is applied to the summer 100 along with the nominal flaperon droop signal. The flaperon droop change, $\Delta\delta_{FR}$, signal is added to the nominal flaperon droop signal. The output of the summer 100 is a flaperon position command. Because the function of the LAM illustrated in FIG. 9 is otherwise identical to the function of the LAM illustrated in FIG. 3, no further description is set forth here.

FIG. 10 illustrates how the aft body contact margin is improved by the addition of LAM depicted in FIG. 9. As shown in FIG. 10, line 80 corresponds to when the airplane flies at some nominal droop position. As will be appreciated by those skilled in this art and others, the nominal droop position may have different values for different airplanes. The distance between point R and the line indicating aft body contact is the aft body contact margin for the airplane flying at $V_{ref}$.

Line 82 corresponds to when the airplane changes to have a flaperon droop position at a deflection causing maximum lift. Of course, the maximum lift deflection value will vary from airplane to airplane. The region on line 84 between point P and point Q represent the operating region of the LAM corresponding to the maximum and minimum constant values of the flaperon droop change, $\Delta\delta_{FR}$, where the flaperons are held at fixed extreme deflections. The horizontal distance between point S on line 82 and point R on line 80 represents the improvement in the aft body contact margin caused by the addition of LAM as indicated by $\theta_{imp,a}$.

While preferred embodiments of the invention have been illustrated and described, it will be appreciated that various changes can be made therein without departing from the spirit and scope of the inventions as defined by the appended claims.

The embodiments of the invention in which an exclusive property or privilege is claimed are defined as follows:

1. A method of modifying the attitude of an airplane during landing, comprising:

generating a reference value for a predetermined flight condition parameter;

producing a current value for said predetermined flight condition parameter;

subtractively combining said reference value and said current value to produce a difference value for said predetermined flight condition parameter;

creating a schedule of deflection values for at least one movable surface capable of producing a lift as a function of said difference value that will meet or exceed a selected aft body contact margin and/or a selected nose gear contact margin for the airplane;

determining a first deflection value for said at least one movable surface from said schedule based on said difference value;

determining a position command based on said first deflection value; and adjusting the position of said at least one movable surface by an amount equal to said position command.

2. The method claimed in claim 1, wherein said at least one movable surface is a flaperon.

3. The method claimed in claim 1, wherein said predetermined flight condition parameter is approach airspeed, said reference value is reference approach airspeed, $V_{ref}$, said current value is current approach airspeed, $V_{cur}$, and said difference value is an airspeed difference, $\Delta V$.

4. The method claimed in claim 3, wherein said at least one movable surface is a flaperon.

5. The method of claim 4, wherein said deflection value is a flaperon droop change, $\Delta\delta_{FR}$, and said step of creating a schedule further comprises:

providing a value of zero for said flaperon droop change, $\Delta\delta_{FR}$, when said airspeed difference, $\Delta V$, is less than 5;

providing a value for said flaperon droop change, $\Delta\delta_{FR}$, according to the equation:

$$\Delta\delta_{FR} = \frac{31}{15} (\Delta V - 5)$$

when said airspeed difference, $\Delta V$, is between five and 20; and providing a value of 31 for said flaperon droop change, $\Delta\delta_{FR}$, when said airspeed difference, $\Delta V$, is greater than 20.

6. The method claimed in claim 5, wherein said generating a reference value includes determining said reference approach airspeed, $V_{ref}$, from the equation:

$$V_{ref} = \frac{1}{\sqrt{n_{Z_{CG}}}} V_{cur} \sqrt{\frac{C_{L_{cur}}}{C_{L_{ref}}}}$$

where:

$V_{ref}$=reference approach airspeed
$n_{Z_{CG}}$=normal load factor at center of gravity
$V_{cur}$=current approach airspeed
$C_{L_{cur}}$=current lift coefficient
$C_{L_{ref}}$=reference lift coefficient.

7. The method claimed in claim 6, including limiting said normal load factor at center of gravity, $n_{Z_{CG}}$, to provide no degradation in the absolute maneuver capability of the airplane.

8. The method claimed in claim 5, wherein said generating a reference value includes determining $V_{ref}$ from the equation:

$$V_{ref} = V_{cur} \sqrt{\frac{C_{L_{cur}}}{C_{L_{ref}}}}$$

where:

$V_{ref}$=reference approach airspeed
$V_{cur}$=current approach airspeed
$C_{L_{cur}}$=current lift coefficient
$C_{L_{ref}}$=reference lift coefficient.

9. The method claimed in claim 5, wherein said generating a reference value includes determining said reference approach airspeed, $V_{ref}$, from a table of values depending on the gross weight and flap detent position of the airplane.

10. The method claimed in claim 5, including low pass filtering said flaperon droop change, $\Delta\delta_{FR}$, to attenuate high frequency content created by turbulence and prevent significant interaction with airplane short period dynamics, while retaining responsiveness to windshears.

11. The method claimed in claim 5, including fixing said flaperon droop change, $\Delta\delta_{FR}$, when the airplane touches the ground.

12. The method claimed in claim 3, wherein said generating a reference value includes determining $V_{ref}$ from the equation:

$$V_{ref} = \frac{1}{\sqrt{n_{Z_{CG}}}} V_{cur} \sqrt{\frac{C_{L_{cur}}}{C_{L_{ref}}}}$$

where:

$V_{ref}$=reference approach airspeed
$n_{Z_{CG}}$=normal load factor at center of gravity
$V_{cur}$=current approach airspeed
$C_{L_{cur}}$=current lift coefficient
$C_{L_{ref}}$=reference lift coefficient.

13. The method claimed in claim 12, including limiting said normal load factor at center of gravity, $n_{Z_{CG}}$, to provide no degradation in the absolute maneuver capability of the airplane.

14. The method claimed in claim 3, wherein said generating step includes determining $V_{ref}$ from the equation:

$$V_{ref} = V_{cur} \sqrt{\frac{C_{L_{cur}}}{C_{L_{ref}}}}$$

where:

$V_{ref}$=reference approach airspeed
$V_{cur}$=current approach airspeed
$C_{L_{cur}}$=current lift coefficient
$C_{L_{ref}}$=reference lift coefficient.

15. The method claimed in claim 3, wherein said generating step includes determining said reference approach airspeed, $V_{ref}$, from a table of values depending on the gross weight and flap detent position of the airplane.

16. The method claimed in claim 1, wherein said predetermined flight condition parameter is approach attitude, said reference value is reference approach attitude, $\theta_{ref}$ said current value is current approach attitude, $\theta_{cur}$, and said difference value is an attitude difference, $\Delta\theta$.

17. The method claimed in claim 16, wherein said at least one movable surface is a flaperon.

18. The method claimed in claim 17, wherein said deflection value is a flaperon droop change, $\Delta\delta_{FR}$.

19. The method claimed in claim 18, wherein said deflection value is a flaperon droop change, $\Delta\delta_{FR}$, and said step of creating a schedule further comprises:

providing a value of zero for said flaperon droop change, $\Delta\delta_{FR}$, when said attitude difference, $\Delta\theta$, is greater that $-1$;

providing a value for said flaperon droop charge, $\Delta\delta_{FR}$, according to the equation:

$$\Delta\delta_{FR} = \frac{-31}{2} (\Delta\theta + 1)$$

when said attitude difference, $\Delta\theta$, is between $-3$ and $-1$; and providing a value of 31 for said flaperon droop change, $\Delta\delta_{FR}$, when said attitude difference, $\Delta\theta$, is less than $-3$.

20. The method claimed in claim 1, wherein said predetermined flight condition parameter is approach angle of attack, said reference value is reference approach angle of attack, $\alpha_{ref}$, said current value is current approach angle of attack, $\alpha_{cur}$, and said difference value is an angle of attack difference, $\Delta\alpha$.

21. The method claimed in claim 20, wherein said at least one movable surface is a flaperon.

22. The method claimed in claim 21, wherein said deflection value is a flaperon droop change, $\Delta\delta_{FR}$.

23. The method claimed in claim 22, wherein said deflection value is a flaperon droop change, $\Delta\delta_{FR}$, and said step of creating a schedule further comprises:

providing a value of 31 for said flaperon droop change, $\Delta\delta_{FR}$, when said angle of attack difference, $\Delta\alpha$, is less than −3;

providing a value for said flaperon droop change, $\Delta\delta_{FR}$, according to the equation:

$$\Delta\delta_{FR} = \frac{-31}{2}(\Delta\alpha + 1)$$

when said angle of attack difference, $\Delta\alpha$, is between −3 and −1; and providing a value of zero for said flaperon droop charge, $\Delta\delta_{FR}$, when said angle of attack difference, $\Delta\alpha$, is greater than −1.

* * * * *

UNITED STATES PATENT AND TRADEMARK OFFICE
CERTIFICATE OF CORRECTION

PATENT NO. : 5,823,479
DATED : October 20, 1998
INVENTOR(S) : B.N. Nield et al.

It is certified that error appears in the above-indentified patent and that said Letters Patent is hereby corrected as shown below:

| COLUMN | LINE | |
|---|---|---|
| [57] | Abstract | after "method" insert --for-- |
| 13 (Claim 5, line 10) | 6 | after "; and" insert a paragraph return |
| 14 (Claim 16, line 3) | 28 | after "$\theta_{ref}$" insert --,-- |
| 14 (Claim 19, line 5) | 41 | "that" should read --than-- |
| 14 (Claim 19, line 7) | 43 | "charge" should read --change-- |
| 16 (Claim 23, line 12) | 3 | "charge" should read --change-- |

Signed and Sealed this

Sixth Day of April, 1999

Attest:

Q. TODD DICKINSON

*Attesting Officer*     *Acting Commissioner of Patents and Trademarks*